(12) United States Patent
Chen et al.

(10) Patent No.: US 8,077,428 B1
(45) Date of Patent: Dec. 13, 2011

(54) DISK DRIVE CORRECTING POSITION ERROR SIGNAL BASED ON VELOCITY OF HEAD

(75) Inventors: Min Chen, San Leandro, CA (US); Qixing Zheng, Albany, CA (US); James V. Wiseman, Palo Alto, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/821,360

(22) Filed: Jun. 23, 2010

(51) Int. Cl.
*G11B 21/02* (2006.01)

(52) U.S. Cl. ........................................ 360/75

(58) Field of Classification Search .................. None
See application file for complete search history.

(56) References Cited

U.S. PATENT DOCUMENTS

| | | | |
|---|---|---|---|
| 4,669,004 A | 5/1987 | Moon et al. | |
| 5,369,345 A * | 11/1994 | Phan et al. | 318/561 |
| 5,668,679 A | 9/1997 | Swearingen et al. | |
| 5,946,158 A | 8/1999 | Nazarian et al. | |
| 5,982,173 A | 11/1999 | Hagen | |
| 6,067,204 A | 5/2000 | Tremaine | |
| 6,091,564 A | 7/2000 | Codilian et al. | |
| 6,091,567 A | 7/2000 | Cooper et al. | |
| 6,369,974 B1 | 4/2002 | Asgari et al. | |
| 6,751,043 B2 * | 6/2004 | Magee et al. | 360/77.02 |
| 6,768,609 B2 | 7/2004 | Heydt et al. | |
| 6,937,420 B1 | 8/2005 | McNab et al. | |
| 6,989,956 B2 | 1/2006 | Takaishi et al. | |
| 6,995,945 B2 * | 2/2006 | Kohso et al. | 360/78.06 |
| 7,019,937 B1 | 3/2006 | Liikanen et al. | |
| 7,023,637 B1 | 4/2006 | Kupferman | |
| 7,027,257 B1 | 4/2006 | Kupferman | |
| 7,061,708 B2 | 6/2006 | Ehrlich et al. | |
| 7,123,433 B1 | 10/2006 | Melrose et al. | |
| 7,130,146 B2 | 10/2006 | Ehrlich | |
| 7,149,048 B1 | 12/2006 | Ray et al. | |
| 7,180,696 B2 | 2/2007 | Ehrlich | |
| 7,203,028 B2 * | 4/2007 | Chung et al. | 360/78.06 |
| 7,230,786 B1 | 6/2007 | Ray et al. | |
| 7,230,789 B1 | 6/2007 | Brunnett et al. | |
| 7,245,451 B2 | 7/2007 | Ehrlich | |
| 7,253,984 B1 | 8/2007 | Patapoutian et al. | |
| 7,256,956 B2 | 8/2007 | Ehrlich | |
| 7,265,933 B1 | 9/2007 | Phan et al. | |
| 7,312,943 B2 | 12/2007 | Lau et al. | |
| 7,382,564 B1 | 6/2008 | Everett et al. | |

(Continued)

FOREIGN PATENT DOCUMENTS

JP 2001256741 A 9/2001

OTHER PUBLICATIONS

U.S. Appl. No. 12/537,974, filed Aug. 7, 2009, 26 pages.

*Primary Examiner* — K. Wong

(57) ABSTRACT

A disk drive is disclosed comprising a head actuated over a disk comprising a plurality of servo sectors that define a plurality of servo tracks. A position error signal (PES) is generated in response to the servo sectors, and a head velocity is estimated relative to the servo tracks. A correction value is generated as a function of the head velocity and the PES, and the PES is adjusted using the correction value to generate an adjusted PES. The head is positioned over the disk in response to the adjusted PES.

22 Claims, 7 Drawing Sheets

U.S. PATENT DOCUMENTS

| | | |
|---|---|---|
| 7,423,835 B2 | 9/2008 | Sado et al. |
| 7,450,336 B1 | 11/2008 | Wang et al. |
| 7,542,230 B1 | 6/2009 | Melrose et al. |
| 7,616,399 B1 | 11/2009 | Chen et al. |
| 7,656,604 B1 | 2/2010 | Liang et al. |
| 7,876,523 B1 | 1/2011 | Panyavoravaj et al. |
| 2009/0067084 A1 | 3/2009 | Lau et al. |
| 2009/0097157 A1 | 4/2009 | Spaur et al. |

* cited by examiner $f(PES) = [\cos(2\pi PES/N) - 1]$

DISK DRIVE CORRECTING POSITION ERROR SIGNAL BASED ON VELOCITY OF HEAD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

FIG. 1 shows a prior art disk format 2 comprising a number of data tracks 4 defined by concentric servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION OF EMBODIMENTS OF THE INVENTION

Figure 1:
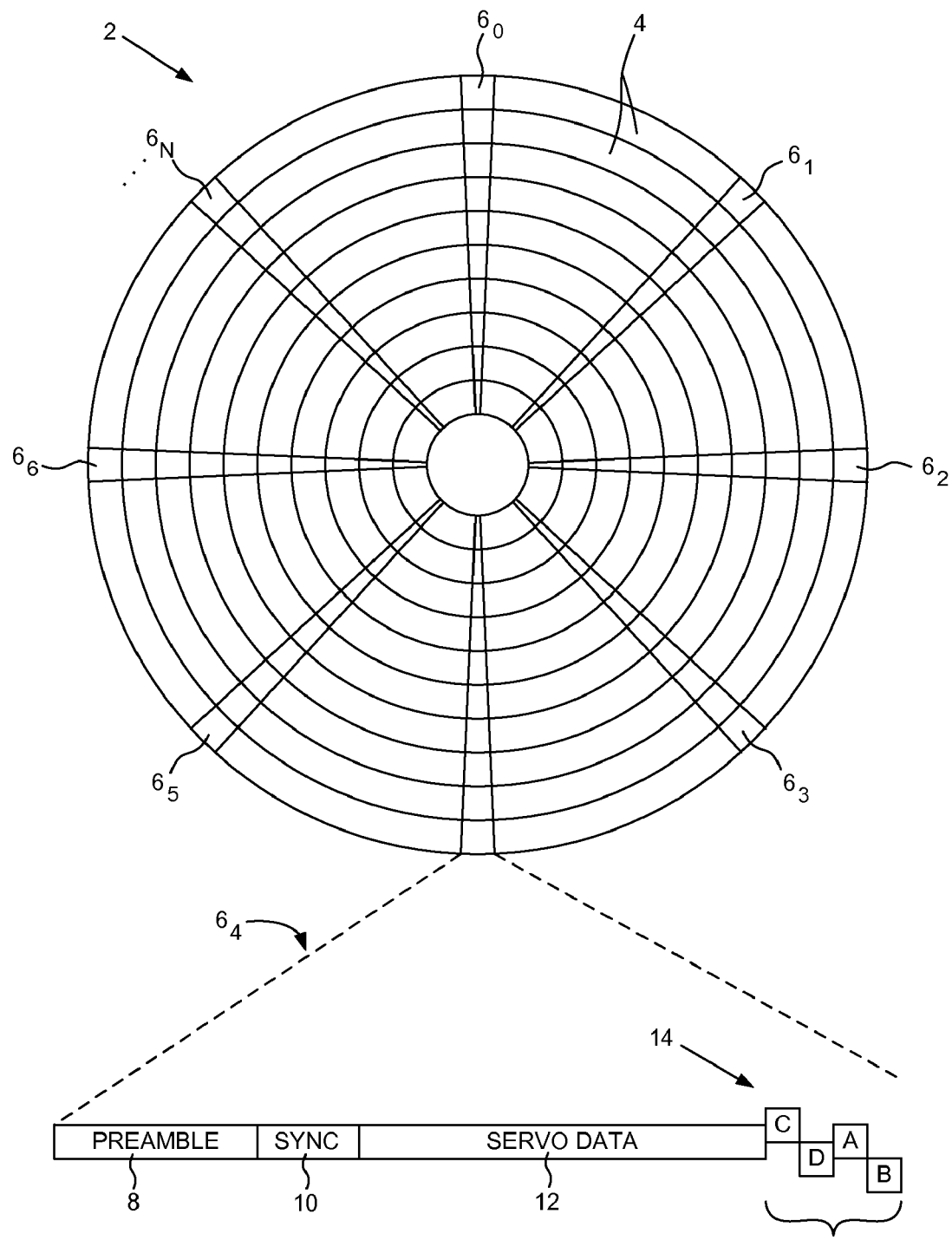
FIG. 1 shows a prior art disk format comprising a plurality of servo sectors that define a plurality of servo tracks.
Figures 2A, 2B:
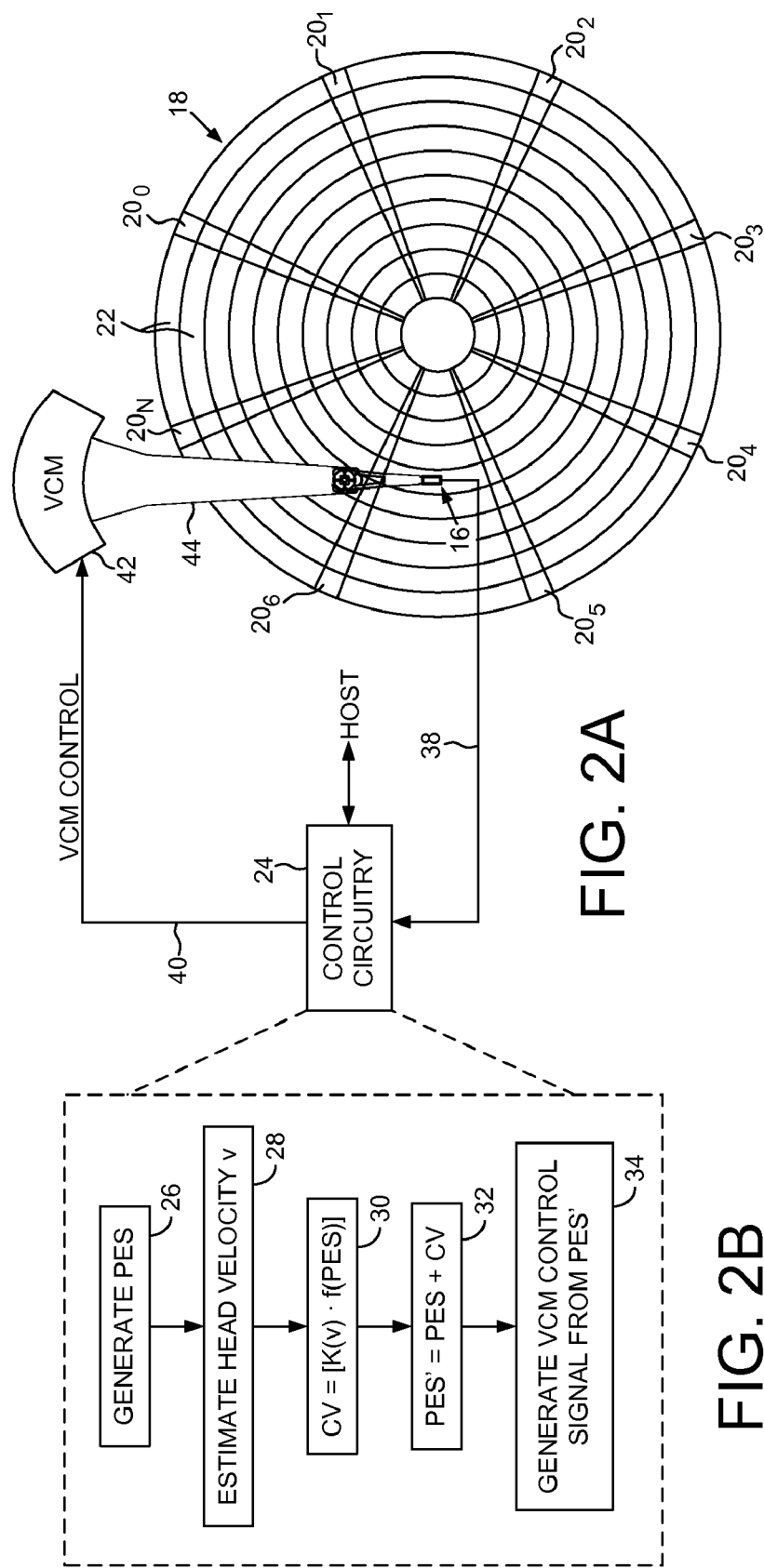
FIG. 2A shows a disk drive according to an embodiment of the present invention comprising a head actuated over a disk and control circuitry.
FIG. 2B is a flow diagram executed by the control circuitry for adjusting a position error signal (PES) as a function of a velocity of the head and a PES generated from reading the servo sectors.

FIG. 2A shows a disk drive according to an embodiment of the present invention comprising a head 16 actuated over a disk 18 comprising a plurality of servo sectors $20_0$-$20_N$ that define a plurality of servo tracks 22. The disk drive further comprises control circuitry 24 operable to execute the flow diagram of FIG. 2B, wherein a position error signal (PES) is generated in response to the servo sectors (step 26), and a head velocity relative to the servo tracks is estimated (step 28). A correction value is generated as a function of the head velocity and the PES (step 30), and the PES is adjusted using the correction value to generate an adjusted PES (step 32). The head is positioned over the disk in response to the adjusted PES (step 34).

In the embodiment of FIG. 2A, the control circuitry 24 processes a read signal 38 emanating from the head 16 in order to generate an initial PES from the servo sectors $20_0$-$20_N$. The control circuitry 24 adjusts the PES as a function of the head velocity and the initial PES, and filters the adjusted PES using a suitable compensation filter to generate a control signal 40 applied to a voice coil motor (VCM) 42. The VCM 42 rotates an actuator arm 44 about a pivot in order to position the head 16 radially over the disk 18 in a direction that reduces the PES.

Figure 3A:
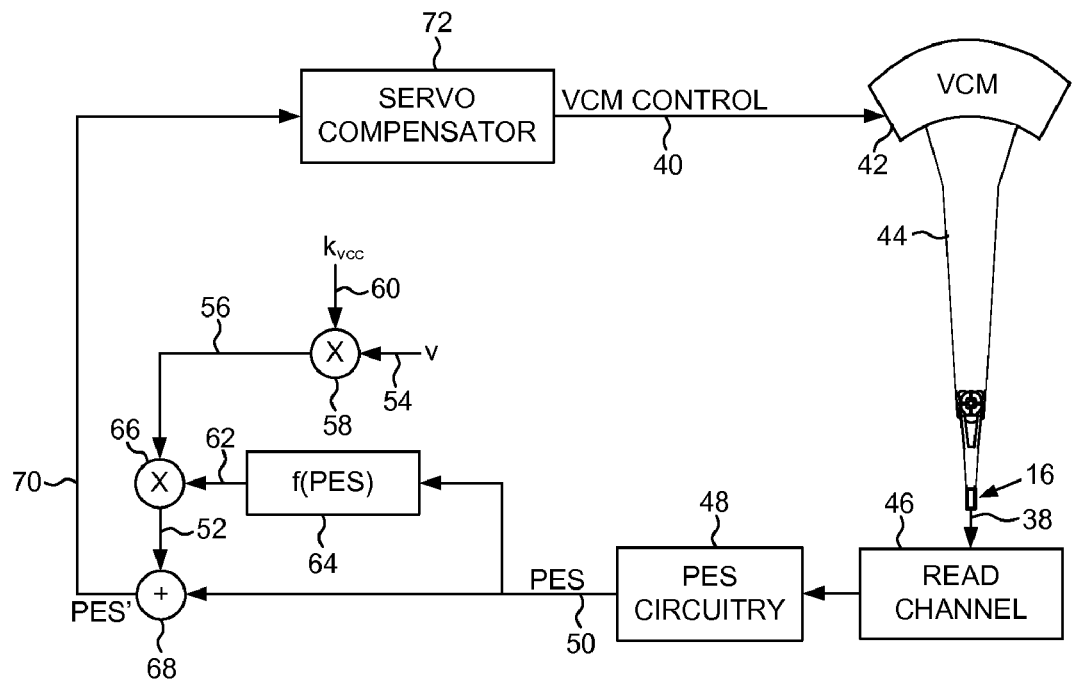
FIG. 3A shows control circuitry according to an embodiment of the present invention for adjusting the PES by multiplying the head velocity by a coefficient and in response to a function of the PES.

FIG. 3A shows control circuitry according to an embodiment of the present invention comprising a read channel 46 for processing the read signal 38 to demodulate servo bursts in the servo sectors $20_0$-$20_N$, and PES circuitry 48 for generating a PES 50 in response to the demodulated servo bursts. A correction value 52 is generated as a function of the head velocity 54 and the PES 50. In the example of FIG. 3A, a first value 56 is generated by multiplying 58 the head velocity 54 by a coefficient 60, and a second value 62 is generated as a function 64 of the PES 50, wherein the second value 62 is scaled 66 by the first value 56 to generate the correction value 52. In the embodiment of FIG. 3A, the correction value 52 is added 68 to the PES 50 to generate an adjusted PES 70. A servo compensator 72 filters the adjusted PES 70 to generate the control signal 40 applied to the VCM 42.

Figure 3B:
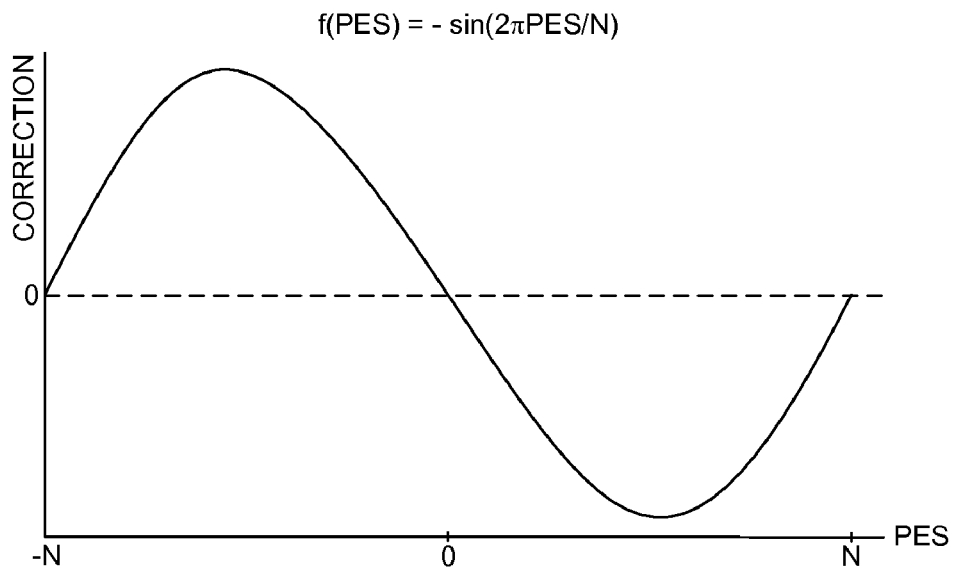
FIG. 3B shows a function of the PES according to an embodiment of the present invention.

FIG. 3B shows an embodiment of the present invention wherein the function 64 of the PES 50 comprises a sine wave $-\sin(2\pi PES/N)$ where N is a maximum PES value. When the head 16 is positioned over the center of a servo track (PES=0), the correction value is zero. As the head 16 deviates from the center of the servo track in either direction (PES non-zero), the correction value changes in a sine wave function such that the correction value again reaches zero when the PES reaches a maximum (positive or negative). The head velocity 54 (scaled by the coefficient 60) adjusts the magnitude of the sine wave shown in FIG. 3B.

In one embodiment, the second value 62 in FIG. 3A is generated as a function 64 of the PES based on the servo burst pattern employed in the servo sectors $20_0$-$20_N$. For example, the sine wave function shown in FIG. 3B may be employed in an embodiment wherein the servo burst pattern is of the form shown in FIG. 7A. As described in greater detail below, a different function 64 may be employed for different servo burst patterns.

Figure 4A:
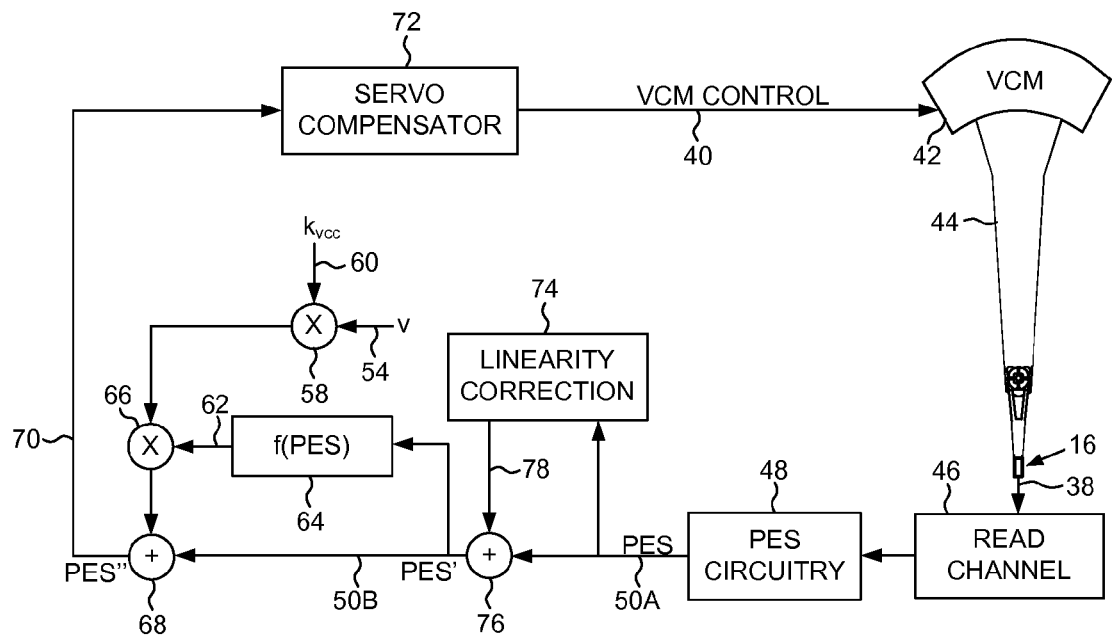
FIG. 4A shows control circuitry according to an embodiment of the present invention comprising a linearity correction of the PES.

FIG. 4A shows control circuitry according to an embodiment of the present invention further comprising a conventional linearity correction block 74 which adjusts the PES 50A by adding 76 a correction value 78 that compensates for a static nonlinear discrepancy between the decoded PES 50A and the actual position of the head relative to the servo track. The correction value 78 is generated using a suitable function or lookup table based on the PES 50A independent of the head velocity. Accordingly, the conventional linearity correction block 74 provides adequate compensation when the head velocity is zero. However, when the head velocity is non-zero (relative to the servo tracks), additional compensation is provided by adding 68 the correction value 52 described above to the PES 50B to generate the adjusted PES 70.

Referring again to FIG. 3A, the coefficient 60 for scaling the head velocity 54 and the function 64 based on the servo burst pattern may be derived in any suitable manner. In one embodiment, the coefficient 60 and function 64 may be derived computationally by evaluating various aspects of the disk drive, such as the geometry of the head as well as the geometry and pattern of the servo bursts. In one embodiment, the coefficient 60 and function 64 may be derived by running a suitable simulation program that models various aspects of the disk drive. In yet another embodiment, the coefficient 60 and function 64 may be derived by executing a suitable calibration program using the control circuitry within a development disk drive or control circuitry of a spin stand. In this embodiment, a nominal coefficient 60 and function 64 may be calibrated for a family of disk drives, wherein corresponding values are programmed into each production disk drive. In another embodiment, each production disk drive may execute a calibration procedure in order to derive or fine tune the coefficient 60 and/or the function 64.

Figure 4B:
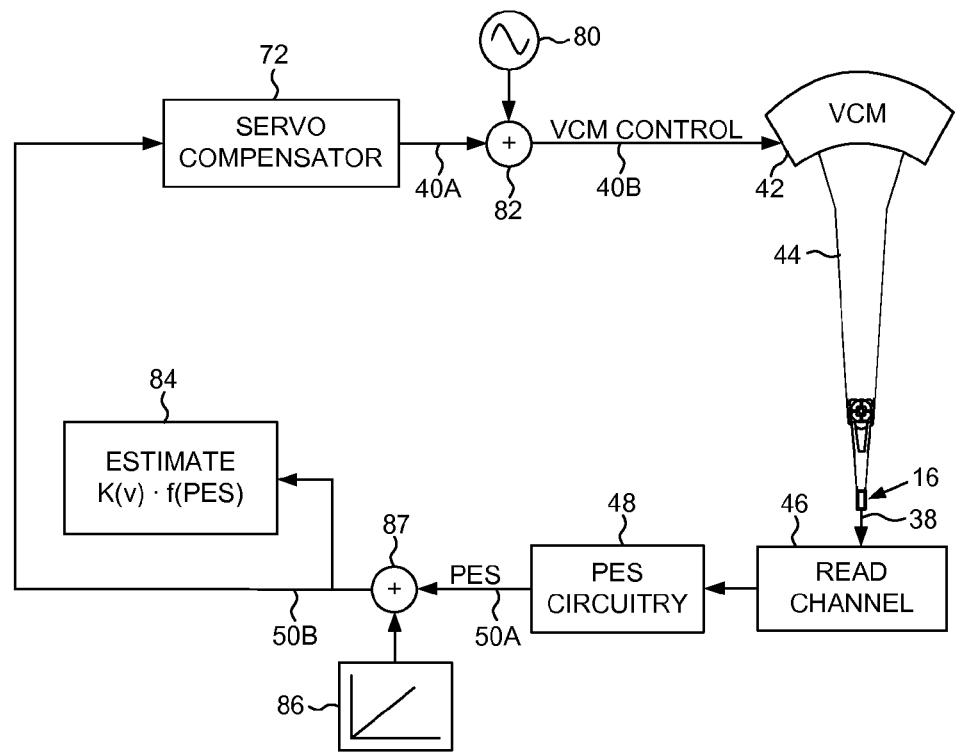
FIG. 4B shows an embodiment of the present invention wherein a linear movement of the head (with a sinusoidal disturbance) is induced in order to calibrate the function for generating the correction values based on the head velocity and the measured PES.

FIG. 4B shows control circuitry according to an embodiment of the present invention for calibrating the coefficient 60 and function 64 of FIG. 3A. The control circuitry of FIG. 4B may be implemented in a development disk drive, a spin stand, or in a production disk drive. In this embodiment, the head is positioned over a servo track and then a ramp signal 86 is added 87 to the PES 50A to generate a ramped PES 50B. The ramped PES 50B induces a linear movement of the head 16 at a constant velocity, thereby inducing a radial velocity of the head with respect to the servo tracks. Also in the embodiment of FIG. 4B, a sinusoidal control signal 80 having an amplitude less than the width of a servo track is added 82 to the VCM control signal 40A in order to dither the PES. In one embodiment, the sinusoidal control signal 80 is generated synchronous with the rotation of the disk (synchronous to the servo sectors) so that the dithered PES is known as the head crosses over each servo sector. Moving the head at a constant velocity over the disk should generate an expected PES from reading the servo sectors. However, the radial velocity of the head 16 relative to the servo tracks causes a non-linear distortion of the PES. Accordingly, the coefficient 60 and function 64 for compensating for this non-linear distortion may be calibrated 84 in one embodiment by evaluating the difference between an expected PES and a measured PES.

Figure 5A:
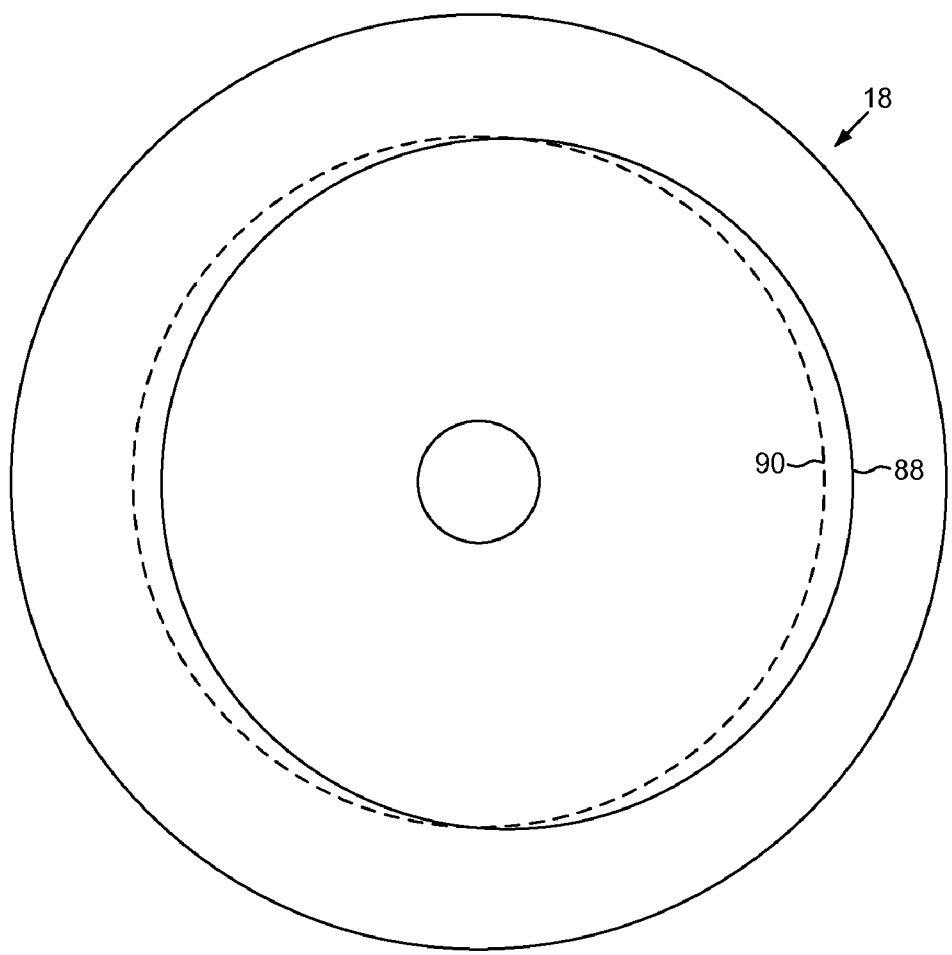
FIGS. 5A and 5B show an embodiment of the present invention wherein a repeatable runout (RRO) of the servo tracks is canceled from the PES thereby causing a radial velocity of the head relative to a servo track during a tracking operation.
Figure 5B:
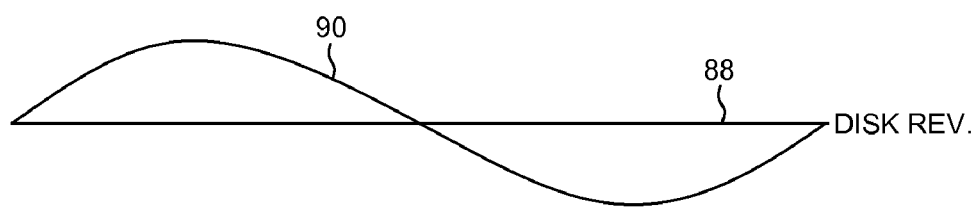

FIG. 5A illustrates an embodiment of the present invention wherein the disk 18 comprises an eccentric servo track 88 relative to a rotational center of the disk 18, and a data track 90 that is substantially circular relative to the rotational center of the disk 18. The eccentricity of the servo track 88 may be due, for example, to an offset between the center axis of a spindle motor that rotates the disk and the center of the disk when clamped to the spindle motor. With the data track 90 defined along a circle path with respect to the center of rotation (the axis of the spindle motor), the data track 90 will move relative to the servo track 88 over a revolution of the disk in a sinusoidal deviation as shown in FIG. 5B. Consequently, when the control circuitry maintains the head along the circular path of the data track 90, the head will have a non-zero radial velocity as it crosses over the servo track 88 (as well as when the head crosses over other adjacent servo tracks). Accordingly, in one embodiment the PES is adjusted to compensate for the non-linear distortion due to the head velocity with respect to the servo tracks as described above.

Figure 6A:
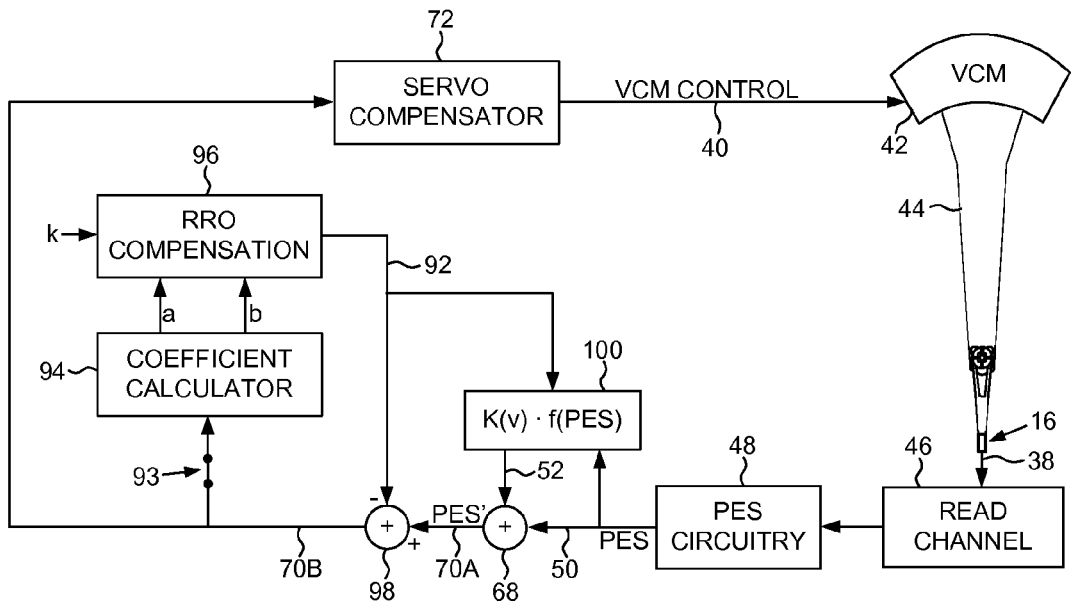
FIG. 6A shows an embodiment of the present invention for calibrating coefficients of a sinusoid representing the RRO of the servo tracks.
Figure 6B:
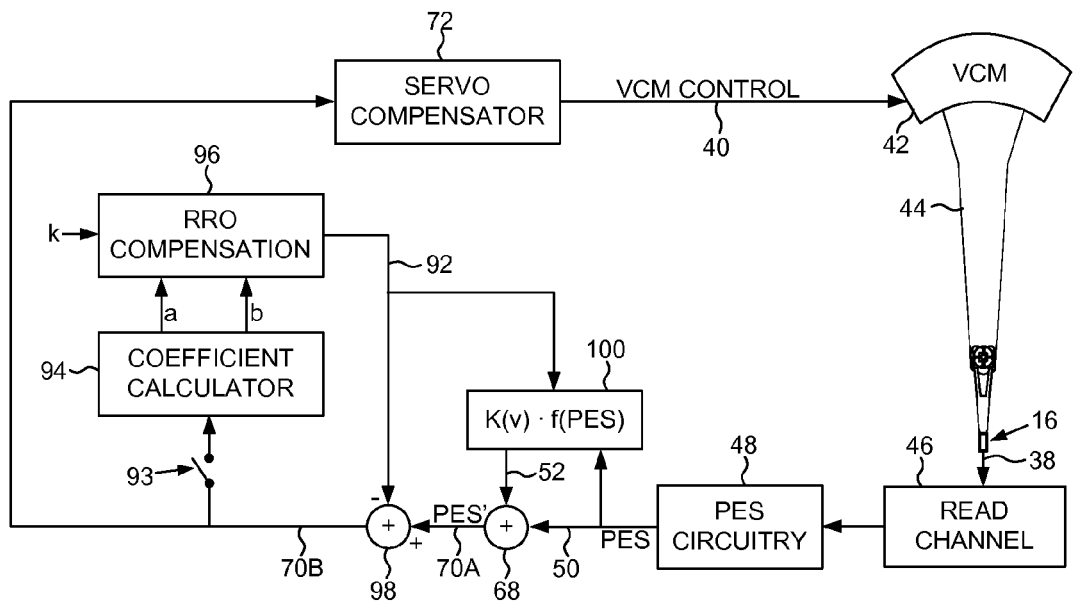
FIG. 6B shows an embodiment of the present invention wherein the head velocity is estimated from the RRO compensation values.

In one embodiment, the control circuitry generates repeatable runout (RRO) compensation values representing a repeatable runout of the servo tracks, and subtracts the RRO compensation values from the PES, thereby causing the head to follow the substantially circular path of the data track and causing a corresponding radial velocity of the head relative to a servo track during a tracking operation as illustrated in FIGS. 5A and 5B. This embodiment is understood with reference to FIGS. 6A and 6B, wherein FIG. 6A shows control circuitry for calibrating the RRO compensation values 92, and FIG. 6B shows control circuitry for subtracting 98 the RRO compensation values 92 from the adjusted PES 70A. A coefficient calculator 94 calculates coefficients of a sinusoid representing the sinusoidal RRO of the servo track. The coefficients of the sinusoid are processed by a compensation circuit 96 to generate an RRO compensation value 92 for each servo sector (indexed by k). During calibration, the coefficient calculator 94 adjusts the coefficients of the sinusoid until the average of the compensated PES 70B falls below a threshold (i.e., until the coefficients converge to correct values). Further details of how the coefficients of the sinusoid may be adapted are disclosed in U.S. Pat. No. 7,265,933 entitled "DISK DRIVE COMPUTING REPEATABLE RUN OUT WHILE ACTUATOR ARM IS PRESSED AGAINST CRASH STOP", the disclosure of which is incorporated herein by reference. Other embodiments may generate the RRO compensation values 92 using different techniques to achieve the same result.

In the embodiment of FIG. 6A, a head velocity compensation block 100 evaluates the RRO compensation values 92 in order to estimate the radial velocity of the head relative to the servo track, and thereby generate the correction value 52 that compensates for the head velocity. For example, the fundamental frequency of the RRO (due to the rotation of the disk) comprises a sinusoid as illustrated in FIG. 5B. Accordingly, in one embodiment the phase and magnitude of the RRO compensation values 92 can be evaluated to estimate the head velocity at each servo sector. Other embodiments of the present invention may use different techniques for estimating the head velocity, such as by computing a derivative of the PES 50 generated for a number of the servo sectors.

Once the RRO compensation values 92 have been calibrated as described above with reference to FIG. 6A, during normal operation the RRO compensation values 92 are subtracted 98 from the PES 70A as shown in FIG. 6B so that the head does not follow the eccentric path of the servo track (but instead follows a substantially circular path of the data track shown in FIG. 5A). The resulting non-linearity due to the head velocity relative to the servo tracks is compensated by the head velocity compensation block 100 as described above. In the embodiment of FIG. 6B, a switch 93 disables the input of the coefficient calculator 94 so that the coefficients of the sinusoid are not adapted during normal operation of the disk drive.

Figure 7A:
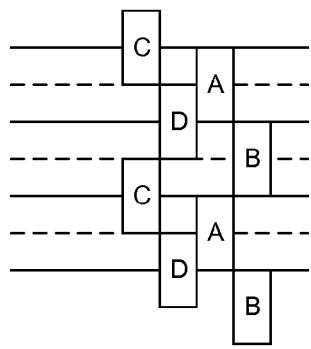
FIG. 7A shows a servo burst pattern according to an embodiment of the present invention.
Figure 7B:
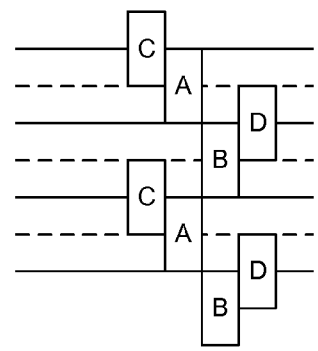
FIG. 7B shows an alternative servo burst pattern according to an embodiment of the present invention.
Figure 7C:
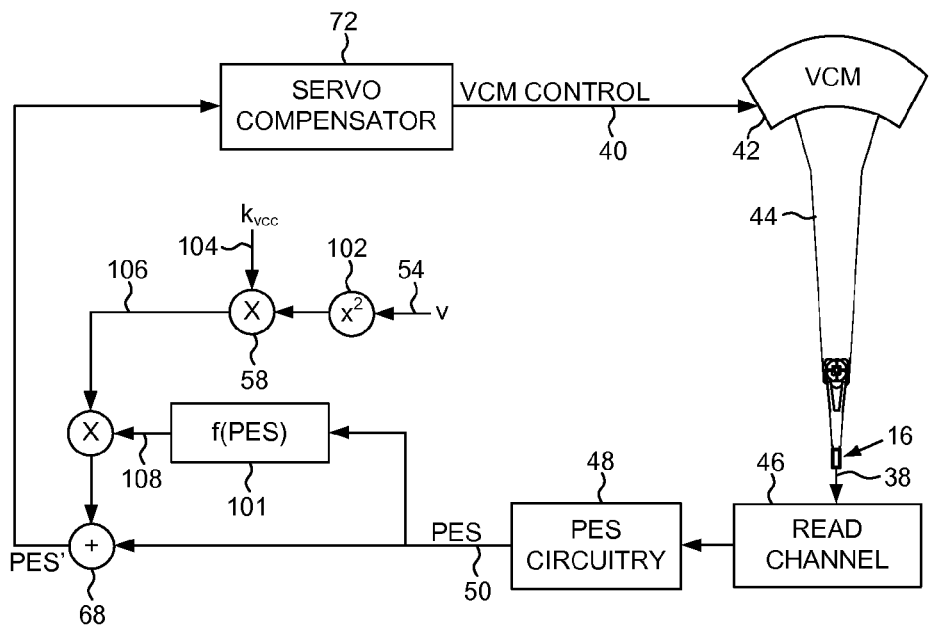
FIGS. 7C and 7D illustrate how the PES correction values are generated for the servo burst pattern of FIG. 7B according to an embodiment of the present invention.
Figure 7D:
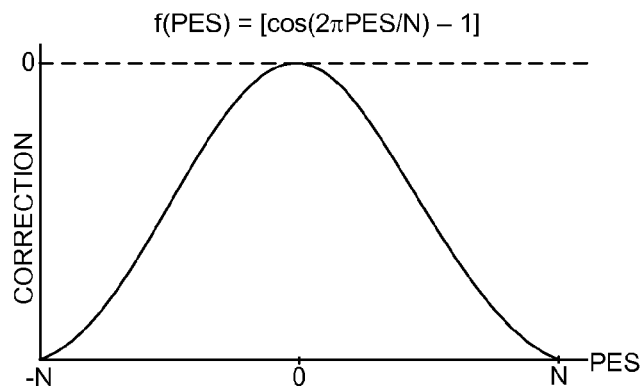

FIG. 7A shows a servo pattern according to an embodiment of the present invention comprising A, B, C, and D servo bursts, wherein the function 64 of FIG. 3A that compensates for the head velocity comprises the sine wave function shown in FIG. 3B. FIG. 7B shows an alternative servo pattern comprising A, B, C and D servo bursts, wherein a function 101 of the PES 50 shown in the embodiment of FIG. 7C comprises a cosine function $[\cos(2\pi PES/N)-1]$ as shown in FIG. 7D. Also in the embodiment of FIG. 7C, the head velocity 54 is squared 102, and the squared head velocity is multiplied 58 by a coefficient 104 to generate a first value 106 for scaling a second value 108 generated by the function 101 of the PES. In this embodiment, the coefficient 104 for scaling the squared head velocity in the embodiment of FIG. 7C may be different from the coefficient 60 in the embodiment of FIG. 3A.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of servo sectors that define a plurality of servo tracks;
    a head actuated over the disk; and
    control circuitry operable to:
        generate a position error signal (PES) in response to the servo sectors;
        estimate a head velocity relative to the servo tracks;
        generate a correction value as a function of the head velocity and the PES;
        adjust the PES using the correction value to generate an adjusted PES; and
        position the head over the disk in response to the adjusted PES.

2. The disk drive as recited in claim 1, wherein:
    each servo sector comprises a plurality of servo bursts that define a servo burst pattern; and
    the function is based on the servo burst pattern.

3. The disk drive as recited in claim 1, wherein the correction value is generated in response to the head velocity multiplied by a coefficient.

4. The disk drive as recited in claim 1, wherein the correction value is generated in response to $\sin(2\pi PES/N)$ where N is a maximum PES value.

5. The disk drive as recited in claim 1, wherein the correction value is generated in response to:

$$k_{vcc} \cdot v \cdot [-\sin(2\pi PES/N)]$$

where:
    v is the head velocity;
    N is a maximum PES value; and
    $k_{vcc}$ is a coefficient operable to scale the head velocity.

6. The disk drive as recited in claim 1, wherein the correction value is generated in response to a square of the head velocity multiplied by a coefficient.

7. The disk drive as recited in claim 1, wherein the correction value is generated in response to $[\cos(2\pi PES/N)-1]$ where N is a maximum PES value.

8. The disk drive as recited in claim 1, wherein the correction value is generated in response to:

$$k_{vcc} \cdot (v)^2 \cdot [\cos(2\pi PES/N)-1]$$

where:
    v is the head velocity;
    N is a maximum PES value; and
    $k_{vcc}$ is a coefficient operable to scale the square of the head velocity.

9. The disk drive as recited in claim 1, wherein the control circuitry is operable to calibrate the function by:
    inducing a movement of the head to induce a radial velocity of the head relative to the servo tracks; and
    evaluating a resulting PES generated in response to the servo sectors.

10. The disk drive as recited in claim 1, wherein the control circuitry is further operable to:
    generate repeatable runout (RRO) compensation values representing a repeatable runout of the servo tracks; and
    subtract the RRO compensation values from the PES thereby causing a radial velocity of the head relative to a servo track during a tracking operation.

11. The disk drive as recited in claim 10, wherein the control circuitry is further operable to estimate the head velocity in response to the RRO compensation values.

12. A method of operating a disk drive, the disk drive comprising a head actuated over a disk comprising a plurality of servo sectors that define a plurality of servo tracks, the method comprising:
    generating a position error signal (PES) in response to the servo sectors;
    estimating a head velocity relative to the servo tracks;
    generating a correction value as a function of the head velocity and the PES;
    adjusting the PES using the correction value to generate an adjusted PES; and
    positioning the head over the disk in response to the adjusted PES.

13. The method as recited in claim 12, wherein:
each servo sector comprises a plurality of servo bursts that define a servo burst pattern; and
the function is based on the servo burst pattern.

14. The method as recited in claim 12, wherein the correction value is generated in response to the head velocity multiplied by a coefficient.

15. The method as recited in claim 12, wherein the correction value is generated in response to $\sin(2\pi PES/N)$ where N is a maximum PES value.

16. The method as recited in claim 12, wherein the correction value is generated in response to:

$$k_{vcc} \cdot v \cdot [-\sin(2\pi PES/N)]$$

where:
v is the head velocity;
N is a maximum PES value; and
$k_{vcc}$ is a coefficient operable to scale the head velocity.

17. The method as recited in claim 12, wherein the correction value is generated in response to a square of the head velocity multiplied by a coefficient.

18. The method as recited in claim 12, wherein the correction value is generated in response to $[\cos(2\pi PES/N)-1]$ where N is a maximum PES value.

19. The method as recited in claim 12, wherein the correction value is generated in response to:

$$k_{vcc} \cdot (v)^2 \cdot [\cos(2\pi PES/N)-1]$$

v is the head velocity;
N is a maximum PES value; and
$k_{vcc}$ is a coefficient operable to scale the square of the head velocity.

20. The method as recited in claim 12, further comprising calibrating the function by:
inducing a movement of the head to induce a radial velocity of the head relative to the servo tracks; and
evaluating a resulting PES generated in response to the servo sectors.

21. The method as recited in claim 12, further comprising:
generating repeatable runout (RRO) compensation values representing a repeatable runout of the servo tracks; and
subtracting the RRO compensation values from the PES thereby causing a radial velocity of the head relative to a servo track during a tracking operation.

22. The method as recited in claim 21, further comprising estimating the head velocity in response to the RRO compensation values.

\* \* \* \* \*